No. 790,410. PATENTED MAY 23, 1905.
F. C. WARNE.
SPRING TRIP.
APPLICATION FILED DEC. 21, 1904.
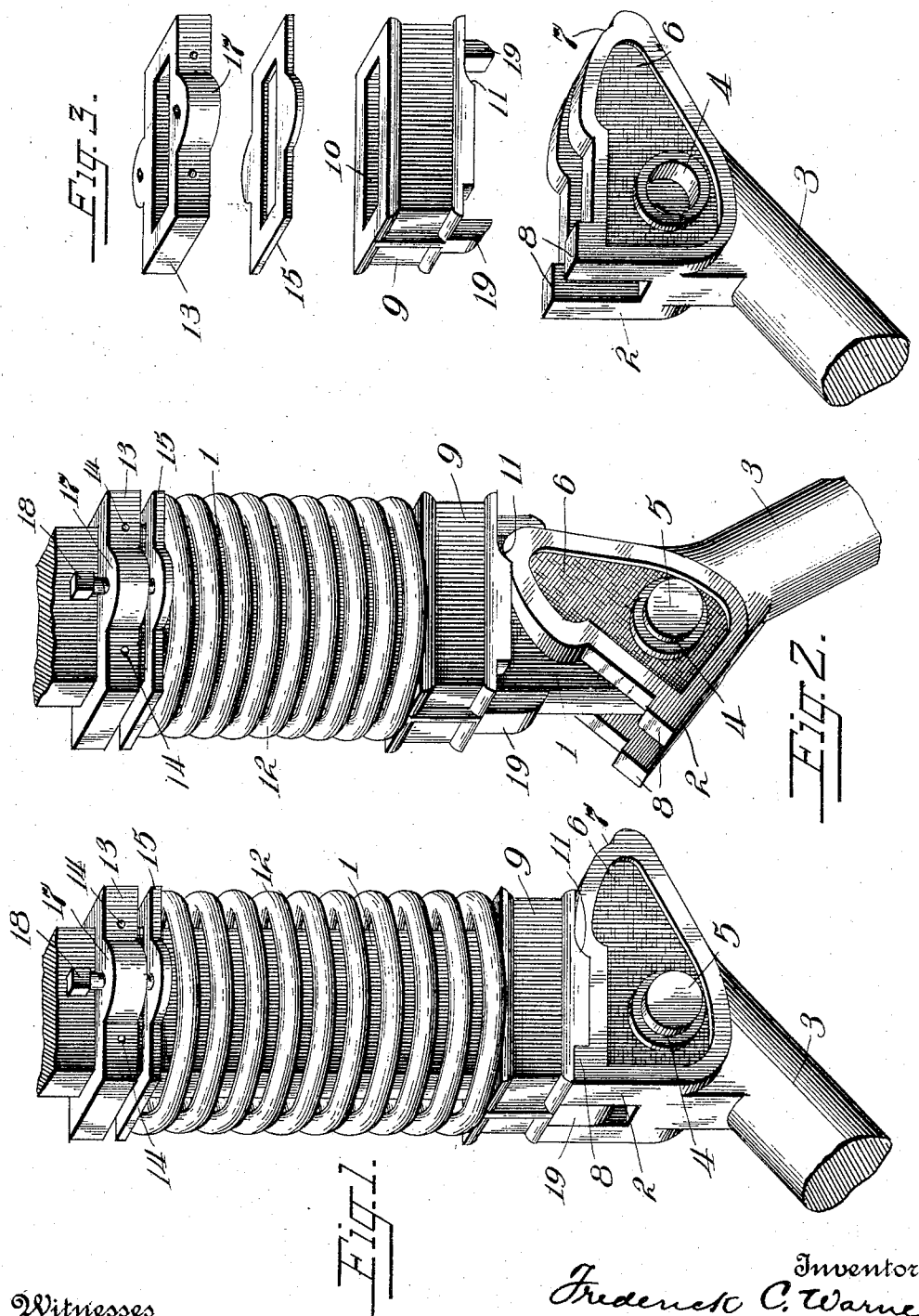

No. 790,410. Patented May 23, 1905.

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

SPRING-TRIP.

SPECIFICATION forming part of Letters Patent No. 790,410, dated May 23, 1905.

Application filed December 21, 1904. Serial No. 237,858.

*To all whom it may concern:*

Be it known that I, FREDERICK C. WARNE, a citizen of the United States of America, and a resident of Mansfield, county of Richland, State of Ohio, have invented certain new and useful Improvements in Spring-Trips, of which the following is a specification.

My invention relates to cultivators or other similar implements used in tilling the soil.

It is well known to those skilled in the art that in the use of cultivators or other implements the shovels or plowing-tools come in contact with foreign substances in the soil—such as stumps, stones, &c.—which greatly interfere with the proper working and in many cases result in breaking some part of the implement. In order to overcome these defects which are incident to the use of the implements now in use, wooden pins are used to lock the shoe in proper position, so that when the shovels strike an obstruction in the soil the strain or impact is borne by the pins, which have less tensile strength than the parts of the implement, which causes the pin to break, permitting the shoe to swing backward, clearing the obstruction, carrying the shovel, which is attached to it. It is then necessary to replace the pin before the operation of cultivating or tilling can be resumed. It will be observed that in providing and using pins as described to protect the implement considerable time and labor is lost in replacing the pins that have been broken and the implement is less efficient and convenient in its operation.

The object of my invention is to obviate these and other defects incident to the use of the cultivator or other similar implements. With this object in view I have provided a means of automatically tripping the shovels or plowing-tools when they come in contact with any obstruction in the soil that is not met with in its ordinary use and returning them to their proper position automatically when they have passed over the obstruction, thereby eliminating the use of wooden pins and saving the time and labor lost in replacing them.

A further object of my invention is to provide a simple, efficient, and practical means of automatically tripping the shovels so as to permit them to pass over any obstruction in the soil and means for returning them to the position required in cultivating or tilling the soil without stopping the team or interfering with the work.

I attain these and other objects by the mechanism illustrated in the accompanying drawings, in which—

Figure 1 is a side view in perspective, showing shovel locked in position for cultivating. Fig. 2 is a side view in perspective, showing shovel released and in position to pass over any obstruction in the soil. Fig. 3 is a side view of the device, showing parts in detail with post and spring removed.

In constructing my tripping device I prefer to use a rectangular post 1. The lower end of the post is adapted to fit the bifurcated end 2 of the boot 3. A suitable aperture is provided in the lower end of the post, coinciding with the aperture 4 in the boot, into which a pin 5 is inserted, pivotally connecting the boot to the post. The upper end of the shoe has a rearwardly-extending portion 6, forming a cam or eccentric when the shoe is pivotally connected to the post. The face 7 of the shoe is inclined, so that when movement is imparted to the shoe and it is swung rearwardly by coming in contact with an obstruction the radius between the pin 5 and the point indicated by the reference-figure 7 is gradually increased until it reaches the position shown in Fig. 2. A projecting portion 8 is made integral with the face of the shoe for the purpose of providing a stop or lock for the shoe when the implement is in operation. A slidable sleeve 9, having a slot 10 in the center, is fitted to the post. The lower face of the sleeve 11 is made to fit and conform to the projecting portion 8 of the face of the shoe and the inclined portion 7. An open coiled spring 12 is fitted to the post with one end resting on the top of the sleeve. A collar 13 is fitted to the post and securely attached thereto by pins 14. A washer 15 is fitted to the post and is inserted between the collar and the top of the coil-spring. Ears 17, having set-screws 18 secured in suitable screw-threaded apertures, are provided, with the ends adapted to contact with the washer, providing a means of increasing or decreasing the tension of the spring. The lugs 19 serve to keep the shoe and slidable sleeve in proper alinement.

The operation of my device is as follows: When the implement is in use, the shoe carrying the shovel or plowing-tool is in the position shown in Fig. 1, with the coil-spring open and exerting a pressure against the sleeve, which in turn contacts with the face of the shoe, holding it in proper position, the tension of the spring being such as to counteract the resistance of the soil. If the shovel or plowing-tool comes in contact with any foreign substance or obstruction in the soil giving a greater resistance than the soil, the impact or pressure causes the shoe to swing rearwardly. The cam or eccentric portion of the shoe being in contact with the face of the sleeve forces it upward against the spring, counteracting its tension and permitting the shoe to swing rearwardly until it passes over the obstruction, leaving it in the position shown in Fig. 2, with the slidable sleeve exerting a pressure, through the medium of the tension of the spring, which is greater than the soil resistance, thereby returning it to its proper position automatically.

What I claim, and desire to secure by Letters Patent, is—

1. A spring-trip comprising a shoe pivotally connected to a post, a slidable sleeve having an inclined lower portion adapted to contact with said shoe, a spring surrounding said post exerting a pressure against said shoe retaining it in proper position under tension, a collar secured to said post and adapted to retain said spring under tension.

2. In a spring-trip a shoe pivotally connected to a bar, having its face inclined with a projecting portion made integral therewith, a slidable sleeve having an inclined face adapted to fit the inclined portion of the shoe, a collar attached to the bar, a spring secured and retained between the collar and slidable sleeve exerting a pressure against the sleeve which is in contact with the face of the shoe retaining the shoe in position when cultivating or tilling the soil, and counteracting the resistance of the soil.

3. A spring-trip comprising a shoe pivotally connected to a bar, a sleeve having an inclined lower portion fitted to said post and adapted to contact with the inclined face of the shoe, means for exerting a pressure against said sleeve retaining the shoe in proper position, means for automatically returning said shoe to the proper position after it has been tripped.

4. A spring-trip composed of a shoe pivotally connected to a bar having an eccentric face, a slidable sleeve fitted to said bar and adapted to contact with the face of the shoe a spring under tension exerting a pressure against said sleeve thereby retaining said shoe in proper position when the implement is in operation the tension of the spring counteracting the resistance of the soil, means for permitting the shoe to swing clear of any obstruction in the soil, means for returning it to its proper position when the shovel has passed over the obstruction.

5. A spring-trip composed of a shoe pivotally connected to a bar or post, a slidable sleeve fitted to said post, a collar attached to said post and adapted to retain a spring between the slidable sleeve and said collar whereby a pressure is exerted against said sleeve which is in contact with the face of the shoe, means for permitting the shoe and the shovel which is attached thereto to swing clear of any obstruction in the soil, and returning it to proper position when the shovel passes over the obstruction.

6. A spring-trip composed of a bar having a shoe pivotally connected thereto, a slidable sleeve having an inclined lower portion fitted to said bar, a spring adapted to contact with said sleeve, a collar securely attached to said bar contacting with and retaining said spring on the bar under tension, a washer fitted to said bar, means for increasing or decreasing the tension of said spring.

Signed at Mansfield, Ohio, this 28th day of November, 1904.

FREDERICK C. WARNE.

Witnesses:
 JOHN H. COSS,
 CHARLES A. LEE.